July 14, 1959   L. F. SCHMID   2,894,413
STEERING WHEEL

Filed May 9, 1956   4 Sheets-Sheet 1

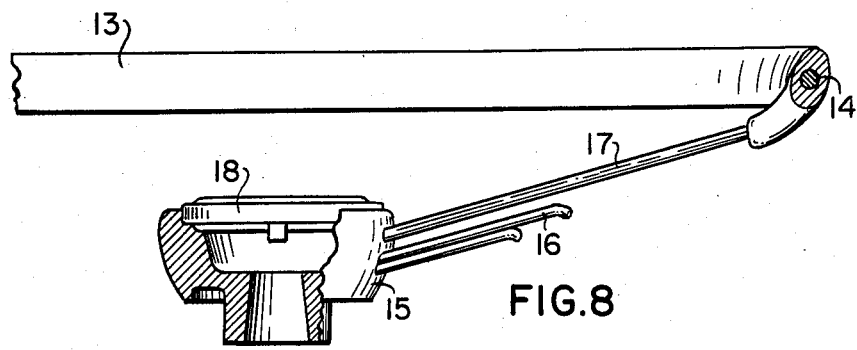
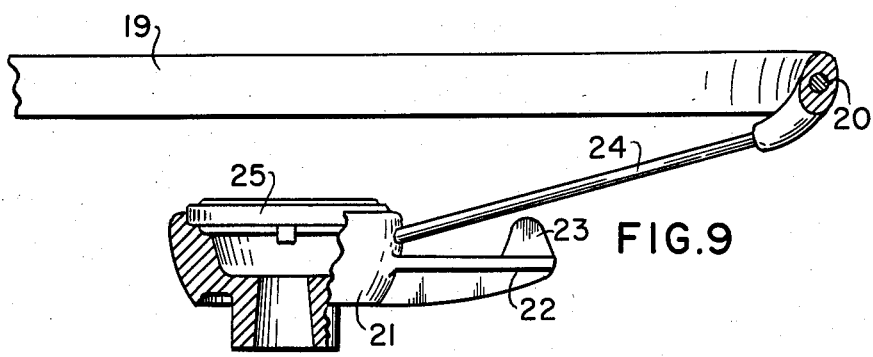
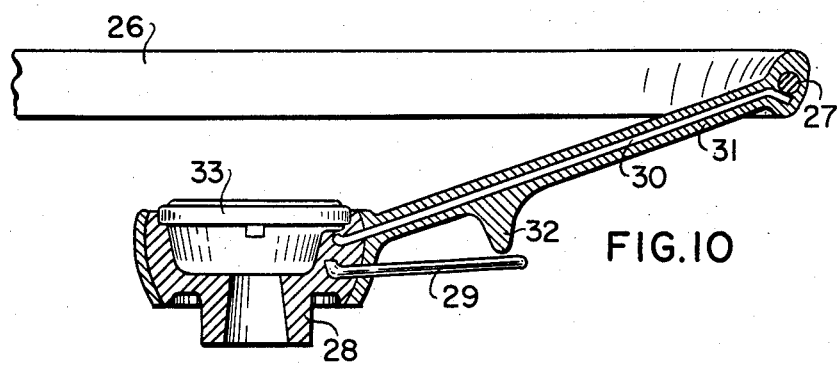

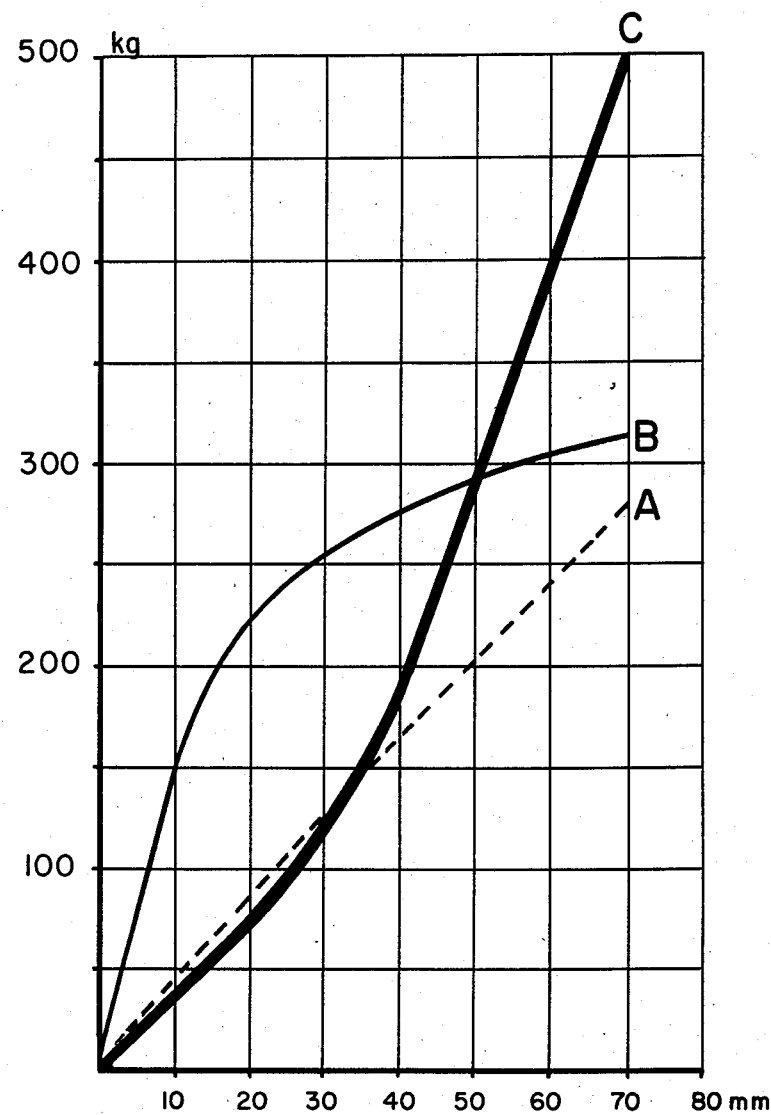
FIG. II

United States Patent Office 2,894,413
Patented July 14, 1959

1

2,894,413

STEERING WHEEL

Leopold Frenz Schmid, Stuttgart, Germany

Application May 9, 1956, Serial No. 583,704

Claims priority, application Germany December 13, 1955

8 Claims. (Cl. 74—552)

This invention relates to steering wheels for motor vehicles, and more particularly to steering wheels adapted so as not to cause injuries to motor vehicle operators during accidents.

In 1946, in the United States alone, 33,700 people were killed and more than one million injured in automobile accidents. In the Journal of the American Medical Association, in 1948, was published an article: "Medical Criticism of Modern Automotive Engineering," written by physicians. Among many other measures, the doctors demanded therein that the driver be protected by means of a steering column that would yield if subjected to great pressures.

A systematic investigation of injuries which people have sustained in accidents and of the resultant deformation of motor vehicles has shown that a driver thrown forward onto a steering wheel is capable of exerting a pressure of 500 kgs. Therefore, according to the invention, steering wheels are proposed which would protect a driver from material injury even when he is thrown forward with great force. These steering wheels are so designed that they will intercept in the best possible manner the impact which results according to the equation wherein force equals mass multiplied by retardation.

Assuming, for example, that a motor vehicle is infinitely rigid and that the steering wheel is absolutely unyielding in connection with the above-noted equation and disregarding the fact that the driver, when thrown forward, will find his arms a resilient support, it can be seen that the upper portion of the driver's torso can be thrown with an infinite force against the steering wheel in an accident.

An object of the invention is to provide means for avoiding the aforenoted result and, briefly, one embodiment of the invention provides a steering wheel with spring-type spokes which through the application of special means is endowed with a progressively increasing elasticity. Through this arrangement of gradually applying resistance to a force, the retardation of the force is controlled in a manner endurable by the driver's body when he is thrown forward. Thus, injuries can be reduced to a minimum.

Another provision of the invention is an arrangement whereby the top of the steering wheel rim is at such an elevation above the highest point of the hub that, even at a pressure of 500 kgs., the top of the rim cannot be forced to a position below the highest hub point.

Other objects and structural details of the invention will be apparent from the following description read in conjunction with the accompanying drawings forming part of this specification and showing various embodiments of the invention, and wherein.

2

Figure 1:
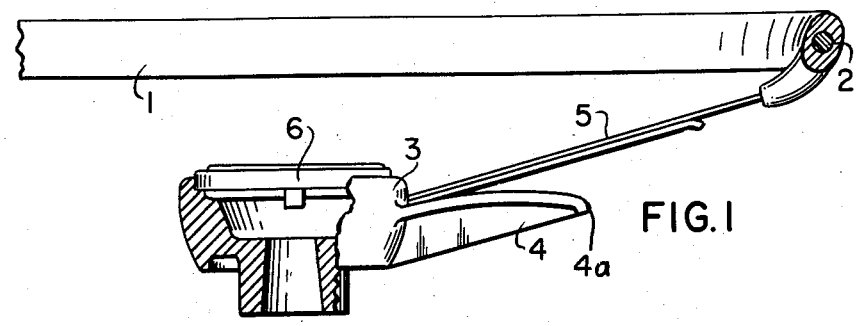
Figure 1 shows a fragmentary vertical section of a steering wheel in accordance with one embodiment of the invention and with its rim in normal position.
Figure 2:
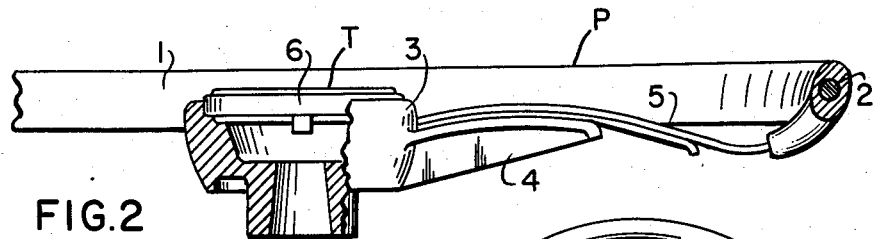
Figure 2 represents the steering wheel of Figure 1 with a load of 500 kgs. pressing against the rim.
Figure 3:
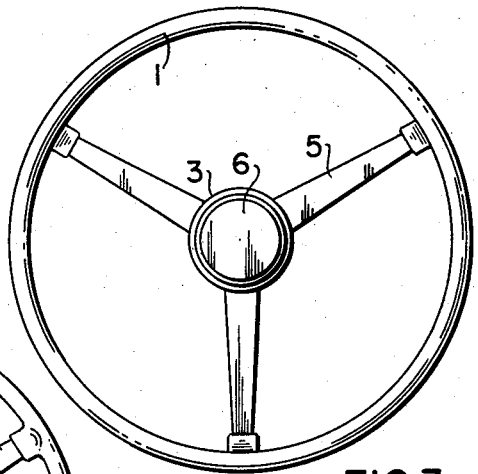
Figure 3 is a top view of the steering wheel of Figure 2.
Figure 4:
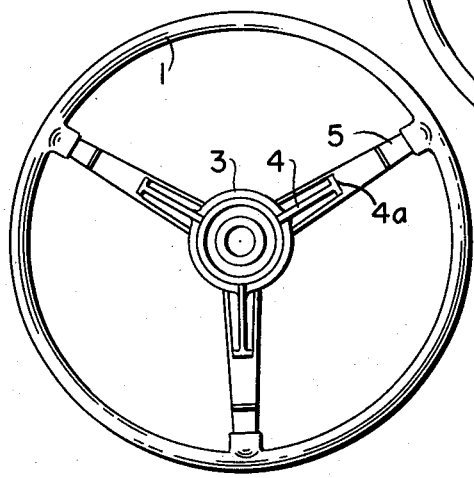

Figure 4 is a bottom view of the steering wheel of Figure 2.

Figure 5:
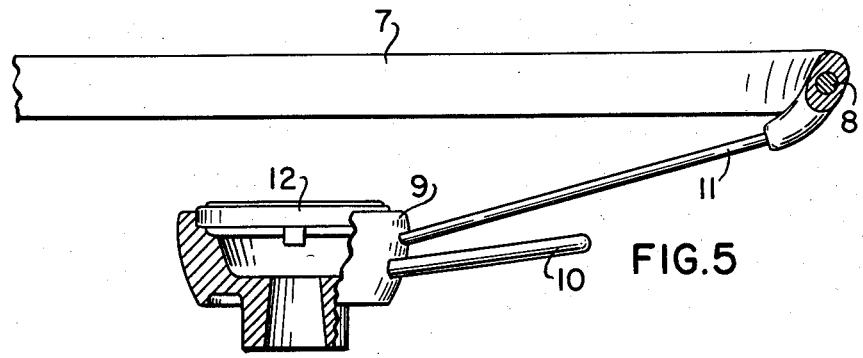

Figure 5 illustrates a fragmentary vertical section of a second embodiment of the invention.

Figure 6:
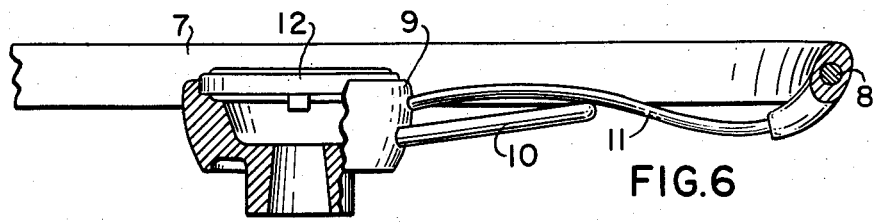

Figure 6 is a view of the steering wheel of Figure 5 with a load of 500 kgs. applied to the rim thereof.

Figure 7:
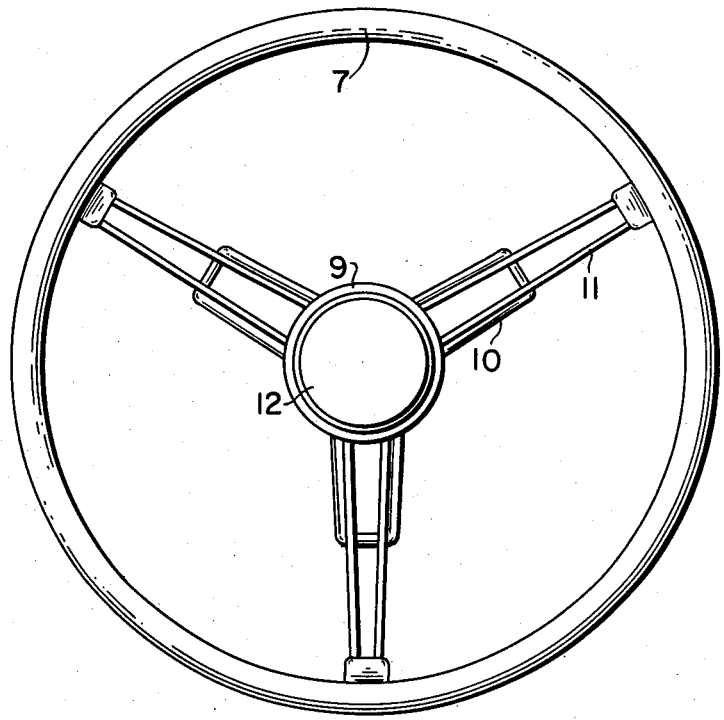

Figure 7 is a top view of the steering wheel of Figure 5.

Figure 8 illustrates a third embodiment of the invention with additional spring means.

Figure 9 shows a further embodiment of the invention incorporating a cantilever structure.

Figure 10 illustrates still another embodiment of the invention incorporating a resilient coating for the steering wheel; and Figure 11 is a diagram which indicates the comparative performance of different types of steering wheels.

In Figures 1–4 is shown a steering wheel in accordance with one embodiment of the invention wherein three spring-type spokes adapted to resist a force with a progressively increasing elasticity are provided with cantilever springs having a curved surface and being mounted underneath the spokes while being rigidly attached to the hub.

Referring now to these figures, the steering wheel is shown as comprising a rim 1, a steel core 2, a steering column or hub 3, cantilevers 4 provided with a curved surface, spring-type or resilient spokes 5 consisting of two leaf springs, and the horn push button 6, constituting the highest point of the steering column or hub. The cantilevers 4, it will be noted, include free ends 4a which are spaced from spokes 5 and are positioned intermediate rim and column or hub 3. Moreover, the spokes extend from the top of column 3 at an angle whereby the rim is supported in a position which is elevated above the top of the column.

Figure 2 indicates particularly the shape of the steering wheel assembly with a force of 500 kgs. applied to the rim 1 to simulate conditions wherein the torso of a driver is thrust at a high speed thereagainst. It will be readily appreciated that, with the cantilevers 4 rigidly positioned with respect to the driving shaft, the spring-type spokes 5 will absorb the impact which if sufficient, will conform the spokes 5 to the shape of the curved surfaces of the cantilevers 4. It is to be noted, however, that the upper plane P remains elevated above the top T of the steering column assembly. This is due to the positions of the free ends of the cantilevers and to the strength of spokes 5.

In Figures 5, 6 and 7, a yoke 10 is provided underneath each of the spring-type spokes 11 which are securely fastened to the steering wheel rim 7. The spokes 11, under pressure, meet the yoke 10 so that, when further pressure is exerted on said springs, a gradually increasing resilience is produced. Figures 5, 6 and 7 also show the steel core 8 of the rim 7, the steering wheel hub 9 and the horn push button 12 which constitutes the highest hub point. The spokes 11 each consist of two cylindrical rods. Figure 6 shows the steering wheel with a load of 500 kgs. pressing against the rim 7 thereof to simulate accident conditions.

Figure 8 shows another embodiment of a steering wheel according to the invention wherein an additional spring is provided beneath the spring-type spokes. This additional spring, which is rigidly connected to the hub, will become operative only after a predetermined resilient travel of the spokes, thus producing a progressively increasing elasticity. In Figure 8, the steering wheel comprises the steering wheel rim 13, the steel core 14 thereof, the steering wheel hub 15, one of the additional springs 16 mounted underneath the spokes 17 and in the form of a two-leaf spring, and the horn button 18 which is the highest point of the hub.

Figure 9 is a view of still another embodiment of the invention according to which a cantilever, rigidly attached to the steering wheel hub, is provided below the spring-type spokes and has on the top thereof a flexible buffer. After traveling over a predetermined spring path, the spokes will press against these buffers which, for example, are made of rubber, so that the resilience of the spokes will progressively increase. Figure 9 shows the steering wheel rim 9, the steel core 20 thereof, the steering wheel hub 21, one of the cantilevers 22 mounted underneath the spokes, one of the buffers 23 of a flexible material, one of the spring-type spokes 24 and the horn button 25 constituting the highest point of the hub.

Figure 10 shows a steering wheel according to the invention wherein not only the rim, but the spokes are likewise provided with a coating of rubber or elastic plastic. The steering wheel of Figure 10 comprises the steering wheel rim 26, the steel core 27 thereof, one of the cantilevers 29 made of steel (whereof the cross section in this embodiment has the shape of a flattened rectangle, the cantilever being cast in one piece with the hub), the steel core 30 of a spoke, having here a flattened cross section, the coating 31 of the spoke, made of rubber or elastic plastic (whereof the cross section constitutes a flattened ellipse), the buffer 32 made of a flexible material and consisting of the same material as the coating of the spokes, and the horn button 33 constituting the highest point of the hub.

Figure 11 is a diagram wherein the curve C indicates the behavior of steering wheels according to the invention, when under a load pressing against the steering wheel rim, as compared with the effect on two other steering wheels. The ordinate axis of the diagram indicates the forces pressing the steering wheel rims in a downward direction and the abscissa axis thereof shows the manner in which the steering wheel rims will travel downwards under the action of said forces. Curve A is the measured result of a load test of a conventional spring-type, three-spoke steering wheel (i. e., a steering wheel with three spring-type spokes) mass-produced under British Patent No. 377,440. This curve is roughly linear and is characteristic of the heretofore known steering wheels provided with spring-designed spokes. Curve B constitutes the measured result of a load test conducted with a steering wheel provided with two non-resilient spokes. This steering wheel is being presently mounted on a mass-production basis on all vehicles of a large German automobile factory and the rim and the two spokes (which are located approximately opposite to each other) are coated with hard rubber (ebonite). The markedly degressive course of said curve B may be explained by the effect of the very thick ebonite coating and by the circumstance that the steel core of the spokes had been strained beyond the yield point thereof. The progressive course of curve C corresponding to a steering wheel according to the invention clearly shows that the impact of a forward bouncing driver is ideally intercepted.

There will now be obvious to those skilled in the art many modifications and variations utilizing the principles set forth and realizing many or all of the objects and advantages of the steering wheels set forth but which do not depart essentially from the spirit of the invention.

What is claimed is:

1. A steering wheel assembly for a vehicle having a steering column comprising a rim, resilient spokes coupling the rim to said column, and cantilevers normally spaced from the spokes and mounted on the column below the spokes, the cantilevers including free ends, said cantilevers being respectively in alignment with said spokes and positioned intermediate the rim and said column.

2. A wheel as claimed in claim 1 wherein the spokes extend from the top of the column at an angle with respect thereto for supporting the rim at a position elevated with respect to the top of the column.

3. A wheel as claimed in claim 2 wherein the rim defines an upper plane normally elevated above the top of the column, the free ends of the cantilevers being positioned relative to the top of the column so that, with the spokes deflected by an amount sufficient to bring the spokes into contact with said free ends, said plane remains elevated above the top of the column.

4. A wheel as claimed in claim 3 wherein the cantilevers include curved surfaces for receiving the spokes.

5. A wheel as claimed in claim 3 comprising flexible buffers between the cantilevers and spokes.

6. A wheel as claimed in claim 3 wherein the cantilevers are rigid yokes.

7. A wheel as claimed in claim 3 wherein the cantilevers are resilient.

8. A wheel as claimed in claim 3 comprising an elastic coating on the spokes and rim.

References Cited in the file of this patent

UNITED STATES PATENTS

| Number | Name | Date |
|---|---|---|
| 1,280,724 | Harroun | Oct. 8, 1918 |
| 1,755,685 | Cowley | Apr. 22, 1930 |
| 1,761,374 | Tower | June 3, 1930 |
| 1,777,315 | Kraft | Oct. 7, 1930 |
| 2,419,656 | Ressinger | Apr. 29, 1947 |